Figure 1:
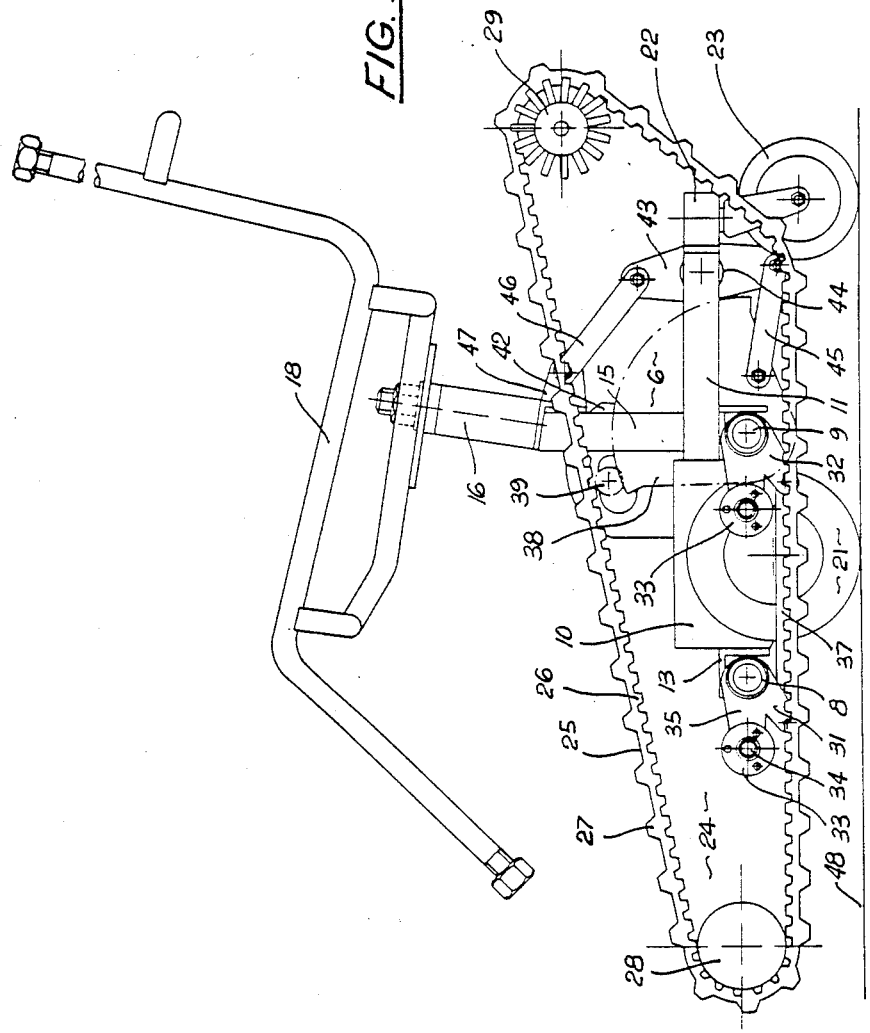

United States Patent [19]

Pagett

[11] Patent Number: 4,564,080
[45] Date of Patent: Jan. 14, 1986

[54] INVALID'S WHEELCHAIR AND LIKE CONVEYANCES

[75] Inventor: Jeffery M. Pagett, Griffith, Australia

[73] Assignee: Australian Transcenders International Pty. Ltd., Australia

[21] Appl. No.: 461,654

[22] Filed: Jan. 27, 1983

[51] Int. Cl.[4] ............................................. B62D 55/04
[52] U.S. Cl. ..................................... 180/8.2; 180/9.28; 280/DIG. 10
[58] Field of Search .................... 180/8.2, 9.28, 9.3, 180/9.26; 280/DIG. 10

[56] References Cited

U.S. PATENT DOCUMENTS 3,276,531  10/1966  Hale et al. ................. 280/DIG. 10

FOREIGN PATENT DOCUMENTS 281277   3/1968  Australia .
476656   9/1976  Australia .
2741323  9/1978  Fed. Rep. of Germany ....... 180/9.3

Primary Examiner—Joseph F. Peters, Jr.
Assistant Examiner—Kenneth R. Rice
Attorney, Agent, or Firm—Arnold, White & Durkee

[57] ABSTRACT

To enable an invalid's wheelchair to negotiate stairways, it has a chassis frame equipped with ordinary motor-driven road wheels for level running and a pair of crawler belts for stair ascent or descent. Either the wheels or the belts may be selected, either to the exclusion of the other, as the mode of travel. A chair or like load carrier is movably mounted on the frame, and linkage is provided so the center of gravity of the load is adjusted to give the required stability for the selected travel mode.

14 Claims, 5 Drawing Figures

INVALID'S WHEELCHAIR AND LIKE CONVEYANCES

This invention relates to invalid's wheelchairs and like conveyances; and, in relation to such conveyances, is concerned to enable them not only to be motive on level floors, pavements and the like, but also able to negotiate steps, flights of stairs, or ramps, either in ascent or descent.

The invention is, first and foremost, directed to the provision of a wheelchair conveyance for disabled persons, but it is conceivably applicable to conveyances or vehicles for other purposes where ability for uphill, downhill and level progress is required, and particularly where the centre of gravity of a load to be carried is relatively high, having regard to the vehicle's wheelbase, as it is in the case of an invalid's wheelchair.

Thus, a conveyance according hereto, instead of being equipped with a load carrier in the form of a chair, could serve as the trolley base for a remotely or otherwise controlled computer-governed automative robot; or, the load carrier of the conveyance could be in the form of a box-like receptacle or deck for simple transport of commodities generally. By way of example of the latter use, the conveyance could be used for keeping an upstairs floor of a building under construction supplied with bricks where the nature of the building renders the use of cranes, hoists, common brick conveyors and the like inconvenient or inexpedient.

Although the invention has general applicability as indicated, its prime purpose is in relation to wheelchairs, also as previously stated, and therefore the invention will be further described herein, by way of example, in terms of a wheelchair.

In summary, the invention provides a conveyance comprising:

a chassis frame, an upright support column pivoted by its lower end on said frame for fore-and-aft swing movement relative to said frame, a load carrier mounted on the upper end of said column, road wheels, whereof at least some are motor-driven, borne on said frame and providing the conveyance with a first wheel-base, two carrier-plates respectively placed at the sides of said frame and each carrying a motor-driven crawler belt the two of which define a second wheel-base for said conveyance, mounting means whereby said carrier-plates are translationally movable in unison thereby to bring one of said wheel-base into floor contact to the exclusion of the other of said wheel-bases, and linkage mechanism coupling said support column and said mounting means whereby the angular disposition of said column is varied so as to dispose the vertical axis through the centre of gravity of said load carrier plus its load within that one of said wheel-bases which is in floor contact.

Figure 3:
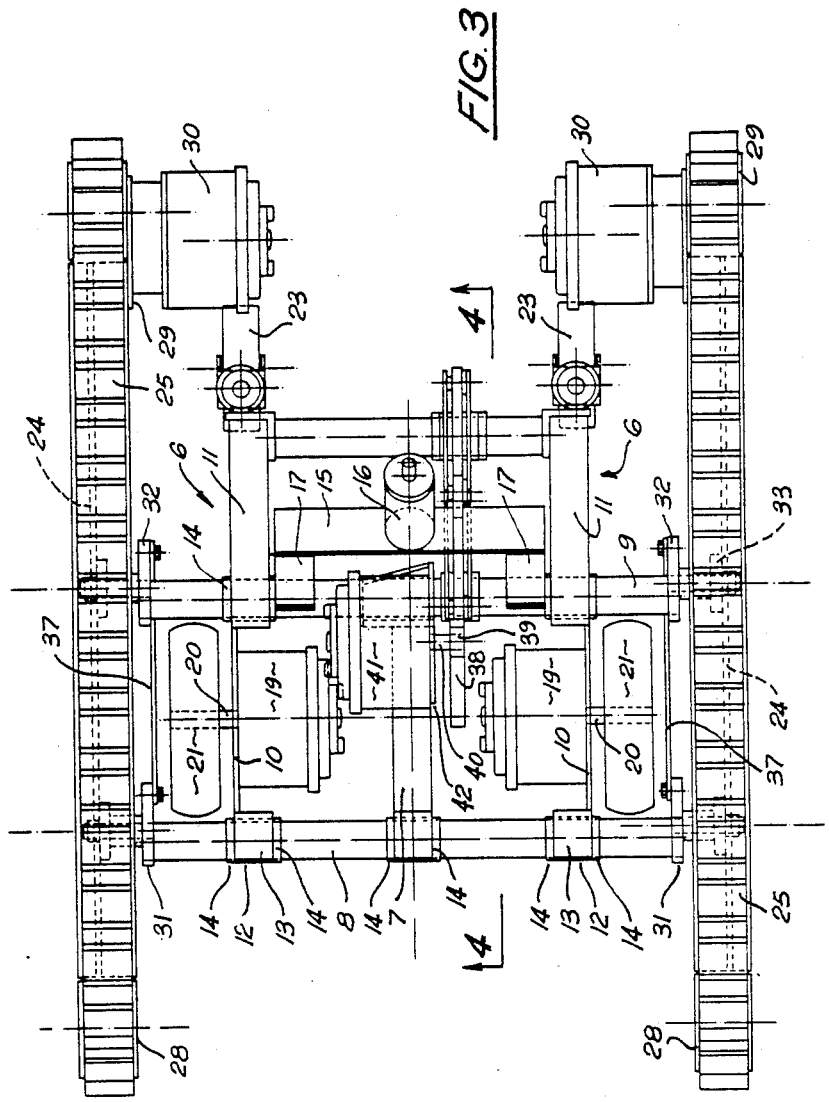
Figure 4:
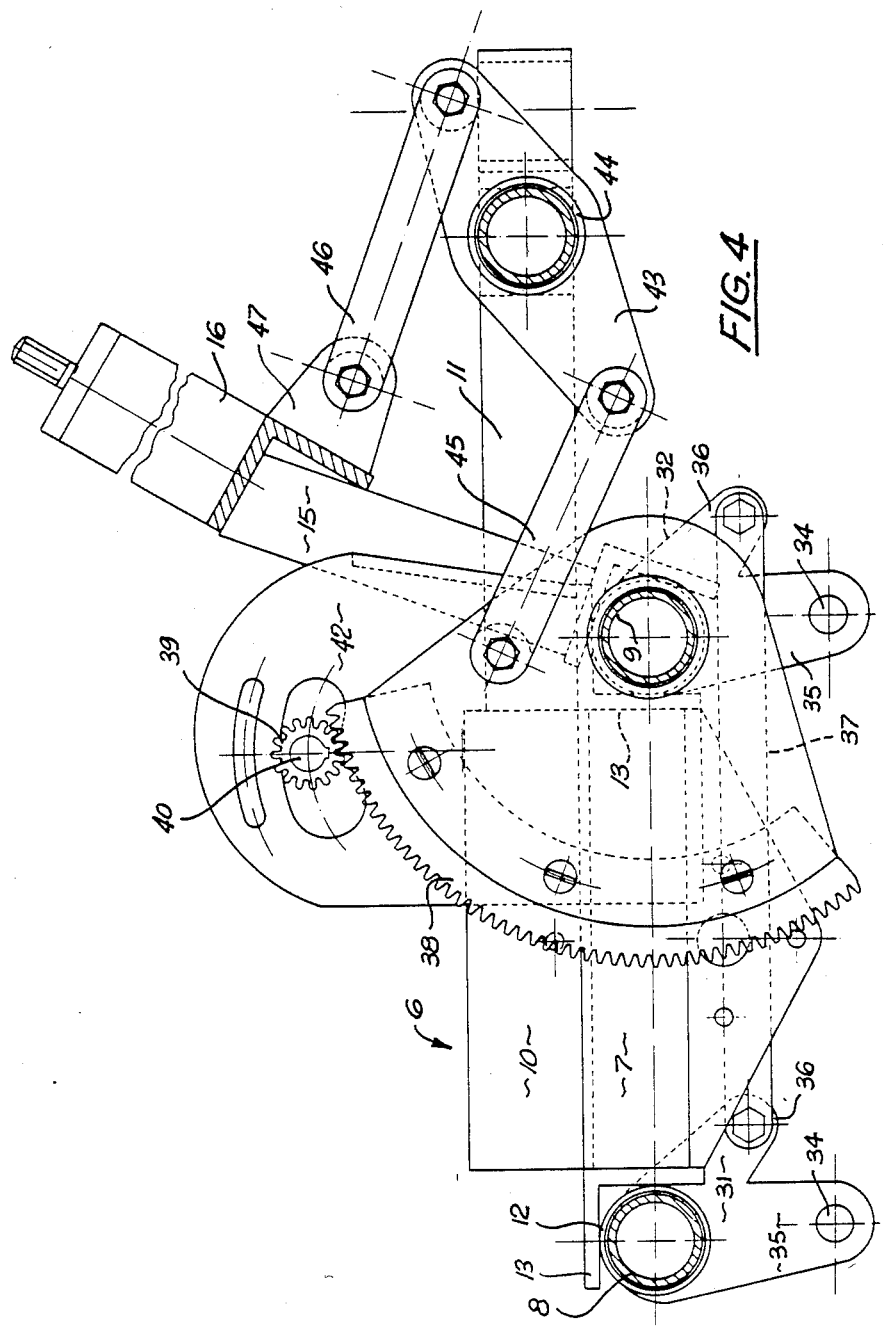
Figure 5:
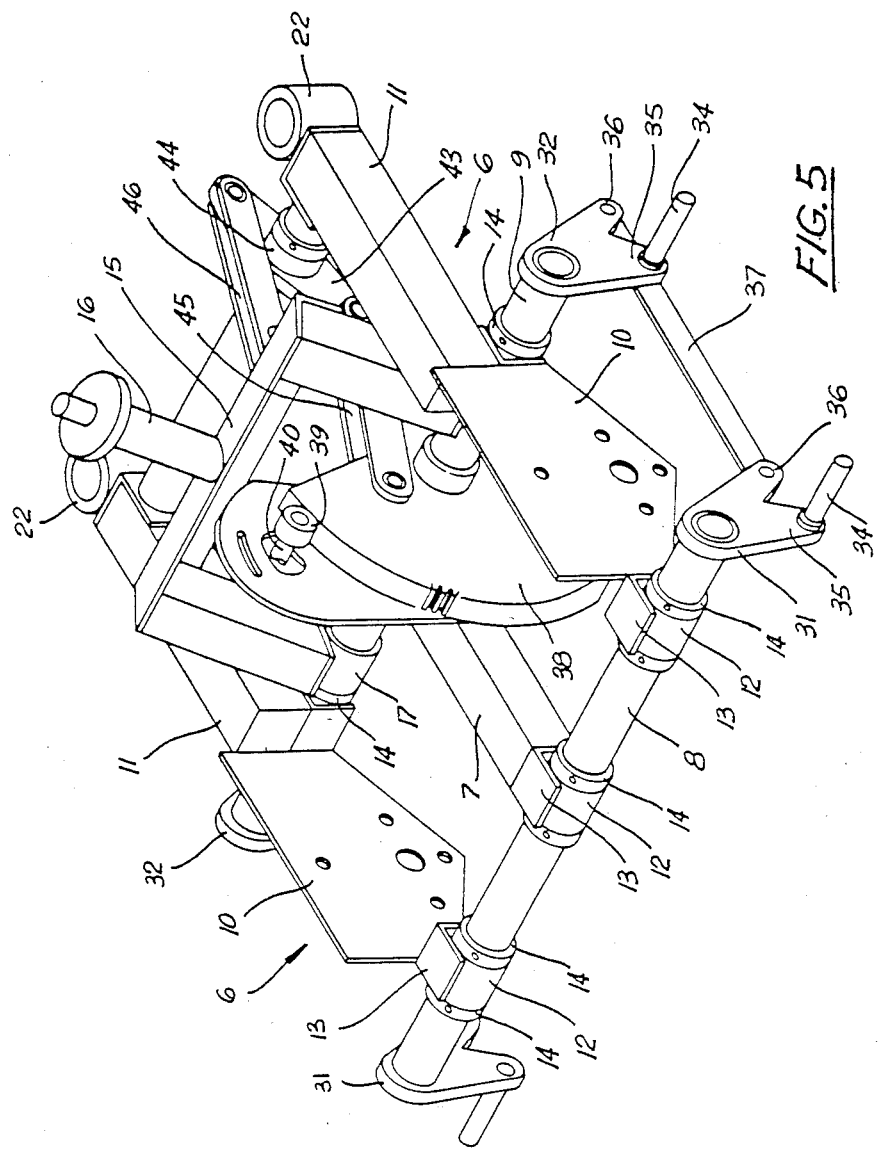

An example of the invention is illustrated in the drawings herewith, wherein:

FIG. 1 is a side elevation of a wheelchair with its parts conditioned for level floor transport. Certain parts are omitted. For example only the skeletal structure of the chair type load carrier is shown, and one of the crawler-carrying mounting-plates is omitted for clarity, FIG. 2 substantially repeats FIG. 1 except for showing the wheelchair parts conditioned for up- or downstairs travel, FIG. 3 is a plan omitting the load-carrier, FIG. 4 is a section, on an enlarged scale, taken on line 4—4 in FIG. 3, and FIG. 5 is a perspective showing of some of the parts already shown in the earlier figures.

Referring to the drawings, the chassis frame is composed of side-rails 6, centre-rail 7 and tranverse shafts 8 and 9. Each side-rail 6 consists of a support-plate portion 10 rigidly fixed to a rod portion 11. Centre-rail 7 extends only between shafts 8 and 9 mainly to act as a steadying influence on the frame to counter-act lateral flexibility of plate portion 10 owing to their thinness. The rails 6 and 7 are furnished with bearing sleeves 12 fixed on the rails by way of angle chairs 13. Shafts 8 and 9 are rotatable within sleeves 12 and are restrained against endwise movement relative thereto by collars 14.

The upright support column consists of a yoke 15 and stem 16 fixed to the yoke. The lower end of the support column is thus in two parts each of which is pivotally mounted on shaft 9 by way of bearing sleeves 17. The upper end of the support column is furnished with any suitable means for mounting a load carrier thereon. In this instance the load carrier is a chair, as indicated at 18, which may be fixed or laterally swivel-mounted on the top of the column.

Support-plates 10 each carry an electric motor 19 having a stub drive shaft 20 with a front road wheel 21 keyed on it. These motors could be powered (where travel distances are relatively short) by flexible cable from conventional power lines, or possibly by way of a trolley wire supply system. For preference the motors are powered by a battery carried on the conveyance. Conventional controls are provided so that the motors may be operated concertedly in forward or reverse, or individually or oppositely for steering purposes.

The distal ends of rod portions 11 carry vertical-axis sleeves 22 for caster-type near road wheels 23.

Wheels 21 and 23 provide the conveyance with its previously mentioned first wheel-base, being that wheel-base which is effective during level floor travel of the conveyance, as indicated in FIG. 1.

Mounting-plate 24 are placed at the sides of the chassis frame and both of them are closely and respectively encompassed by flexible crawler belts 25, having internal gear-teeth 26 and external tread-cleats 27. Belts 25 run about conventional idler pulleys freely-rotatably mounted on plates 24. Two of these idler pulleys are indicated at 28. Belts 25 are separately or combinedly operable by drive pinions 29 each of which has its own motor 30 mounted on the associated mounting plate 24. Motors 30 are controllable in the same way as previously explained in connection with motors 19.

The mounting-plates 24 are operatively connected to the chassis frame by way of front and rear bell-cranks 31 and 32 respectively keyed on shafts 8 and 9 so that bell-cranks 31 will necessarily act as a single entity and bell-cranks 32 will rotate when shaft 9 rotates. Each of the mounting-plates 24 has bearing blocks 33 fixed on its inner side and these receive pins 34 on the bell-cranks arms 35. The bell-crank arms 36, at each side of the chassis frame, are coupled together by connecting rods 37.

Shaft 9 has a sector gear 38 keyed on it, and this gear is meshed by a drive pinion 39 keyed on the stub shaft 40 of a motor 41 mounted on plate 42 fixedly mounted on frame member 7. A transmission lever 43 is fulcrumed at 44 between frame members 11. One arm of lever 43 is coupled to sector gear 38 by link 45, and the other arm of lever 43 is coupled, by link 46, to a lug 47 fixed on column 15/16.

As already stated the wheelchair as shown in FIG. 1 is conditioned for travel on the level; that is, with crawler belts 25 elevated above floor level 48.

Figure 2:
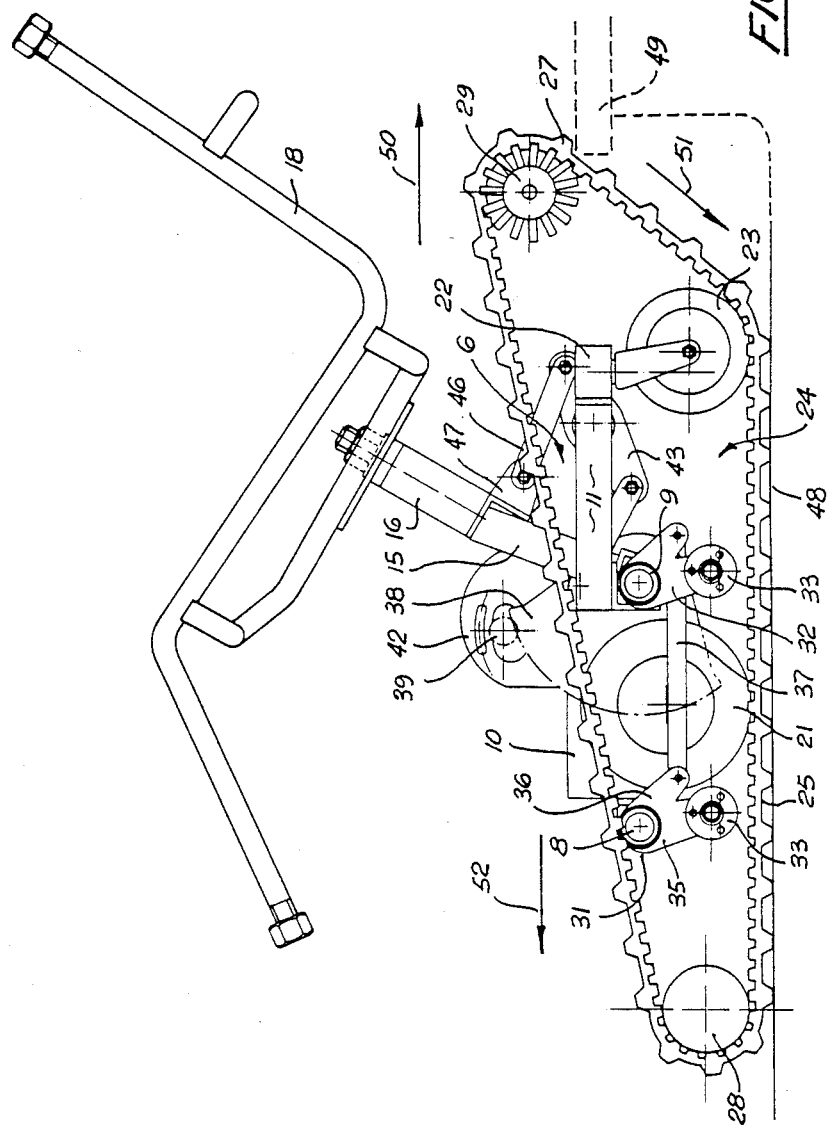

When a step (49 in FIG. 2), or a flight of stairs, is to be climbed, it is approached in the direction indicated by arrow 50 (FIG. 2). Just prior to arrival at the rise, motor 41 is energised so that the sector gear 38 is turned from the position shown for it in FIG. 1 to that shown in FIG. 2. Thus (acting through shaft 9 and bell-cranks 31 and 32) lowering crawler belts 25 to floor level and elevating wheels 21 and 23 clear of the level. In this way the bottom flights of belts 25 become effective as the second wheel-base previously mentioned herein. During the wheel-base change-over, the column 15/16 is swung about its pivot mount on shaft 9 (through the agency of lever 43 and links 45 and 46) from its position shown in FIG. 1 to that shown in FIG. 2 so that the orientation of the load-carrier (18) is better suited to the climb, and at the same time the vertical axis of the centre of gravity of the load-carrier plus its load remain well within the lateral ambit of the second wheel-base.

During the approach to the rise, the belts 25 are, of course, moving in the direction indicated by arrow 51 in FIG. 2 so that when stair contact is made the cleats 27 ensure performance of the climb.

When a descent is to be made the same procedure is followed except that the descent is approached in the direction indicated by arrow 52 in FIG. 2.

It will be appreciated that whereas the pinion (39) which causes part-rotation of the sector gear (38) to effect a wheel-base change-over, is preferably motor-driven (by motor 41); the shaft (40) on which pinion 39 is mounted could carry a worm-wheel meshed by a worm pinion on a shaft manually rotatable by a hand-wheel or the like.

I claim:

1. A conveyance comprising:
   a chassis frame,
   an upright support column pivoted by its lower end on said frame for fore-and-aft swing movement relative to said frame,
   a load carrier mounted on the upper end of said column,
   road wheels, whereof at least some of motor-driven, borne on said frame and providing the conveyance with a first wheel-base for movement over substantially level travel surfaces,
   two carrier-plates respectively placed at the sides of said frame and each carrying a motor-driven crawler belt the two of which define a second wheel-base for movement over substantially inclined travel surfaces,
   mounting means whereby said carrier-plates may be translationally movable in unison thereby to bring one of said wheel-bases into travel surface contact to the exclusion of the other of said wheel-bases, and
   linkage mechanism coupling said support column and said mounting means whereby the angular disposition of said column is varied by a predetermined amount with respect to said chassis frame, upon operation of said mounting means.

2. A conveyance according to claim 1 wherein said load carrier is a chair.

3. A conveyance according to claim 1 wherein said road wheels comprise a pair of front independently motor-driven wheels and a pair of rear castor-wheels.

4. A conveyance according to claim 1 wherein said crawler belts are independantly motor-driven.

5. A conveyance according to claim 1 wherein said chassis frame comprises a pair of side-rails, front and rear shafts rotatable in bearings on said side-rails, and restraining means on said shafts whereby said side-rails are held each to the other in required spacing by said shafts, said shafts being adapted to carry said carrier plates.

6. A conveyance according to claim 5 wherein said support column is pivoted on said rear shaft.

7. A conveyance according to claim 5 wherein all of said road wheels are mounted on said side-rails.

8. A conveyance according to claim 5 wherein the means whereby said carrier plates are movable comprise, for each of said carrier plates, a pair of bell-cranks respectively keyed on said front and rear shafts and each having the free end of one of its arms pivot-connected to the related side-plate, a connecting-rod linking the free ends of the other arms of said bell-cranks, and means for part-rotating said rear shaft.

9. A conveyance according to claim 8 wherein the means for part-rotating said rear shaft comprise a sector gear keyed on said rear shaft, a drive pinion meshing said sector gear, and means to rotate said drive pinion.

10. A conveyance according to claim 9 wherein said linkage mechanism comprises a first order lever fulcrumed on said side-rails, and links whereby the free ends of the arms of said lever are respectively coupled to said sector gear and said support column.

11. A conveyance according to claim 3 wherein said front wheels are disposed centrally with respect to the overall length of said carrier plates.

12. In a conveyance having a chassis frame, road wheels mounted on the frame for providing a first wheel-base for movement of the conveyance on substantially level travel surfaces, crawler belts operatively mounted to the frame for providing a second wheel-base for movement of the conveyance over substantially inclined travel surfaces, and a load carrier operatively connected to said frame, the improvement comprising:
   means mounting said crawler belts to the frame and selectively operable for moving the crawler belts into or out of contact with a travel surface;
   column means pivotally connected to said frame and connected to said load carrier for permitting swinging movement of said load carrier relative to said frame; and
   linkage mechanism for coupling said column means to said belt mounting means for pivoting said load carrier relative to said frame upon operation of said mounting means for automatically positioning the center of gravity of the load carrier relative to one of the wheel-bases for stability purposes.

13. The conveyance of claim 12, wherein the mounting means includes two carrier plates respectively rotatably coupled to the sides of the frame, each carrier plate carrying a respective motor-driven crawler belt.

14. The conveyance of claim 13, wherein the chassis frame comprises a pair of side-rails, a shaft rotatably mounted between the side-rails, and a bell-crank mechanism coupling the shaft to the carrier plates, the linkage mechanism comprising a sector gear keyed to the shaft and a lever fulcrumed to the frame and connected by links between the sector gear and column means, rotation of the sector gear effecting corresponding movement of the carrier plates and the load carrier.

* * * * *

UNITED STATES PATENT AND TRADEMARK OFFICE
CERTIFICATE OF CORRECTION

PATENT NO. : 4,564,080
DATED : January 14, 1986
INVENTOR(S) : Jeffery M. Pagett

It is certified that error appears in the above—identified patent and that said Letters Patent is hereby corrected as shown below:

In Column 3, line 48, please delete the word "of" and insert therefor --are--.

Signed and Sealed this

Fifteenth Day of April 1986

[SEAL]

Attest:

Attesting Officer

DONALD J. QUIGG

Commissioner of Patents and Trademarks